United States Patent [19]

Yamane

[11] Patent Number: 4,480,439
[45] Date of Patent: Nov. 6, 1984

[54] SUPPLY-AIR COOLING SYSTEM FOR AN ENGINE INCLUDING A TURBOCHARGER

[75] Inventor: Ken Yamane, Yokohama, Japan

[73] Assignee: Nissan Motor Company, Limited, Kanagawa, Japan

[21] Appl. No.: 335,336

[22] Filed: Dec. 29, 1981

[30] Foreign Application Priority Data

Jan. 16, 1981 [JP] Japan ............................ 56-4677[U]

[51] Int. Cl.³ ...................... F02B 37/00; F25B 27/00
[52] U.S. Cl. ................................. 60/599; 62/323.1; 62/524; 123/563
[58] Field of Search ...................... 60/599; 123/563; 62/323.1, 524

[56] References Cited

U.S. PATENT DOCUMENTS

| | | | |
|---|---|---|---|
| 2,748,562 | 6/1956 | Kauffmann | 60/599 |
| 2,882,698 | 4/1959 | Boyle | 62/509 |
| 3,186,184 | 6/1965 | Pruitt | 62/323.1 |
| 3,441,011 | 4/1969 | Karl | 62/323.1 |
| 3,459,006 | 8/1969 | Hoyer | 62/323.1 |
| 4,237,689 | 12/1980 | Sampietro | 60/599 |
| 4,270,365 | 6/1981 | Sampeitro | 60/599 |

FOREIGN PATENT DOCUMENTS 1063722  3/1967  United Kingdom.

OTHER PUBLICATIONS

MTZ, 1964, p. 499.

Primary Examiner—Douglas Hart
Attorney, Agent, or Firm—Lowe, King, Price & Becker

[57] ABSTRACT

A system for cooling the air forcibly supplied to an engine in which a turbocharger is provided. The supply air is cooled by a cooler system used for cooling the passenger compartment, before the air is pressurized by an air-supply blower, when the engine load rises beyond a predetermined value. The cooling system according to the present invention comprises a cooling fin unit disposed within the intake duct upstream from the air-supply blower, an electromagnetic valve for circulating a refrigerant into the cooling fin unit, and a control unit for opening the electromagnetic valve when the engine load rises, in addition to a conventional cooler system for cooling the passenger compartment.

3 Claims, 2 Drawing Figures

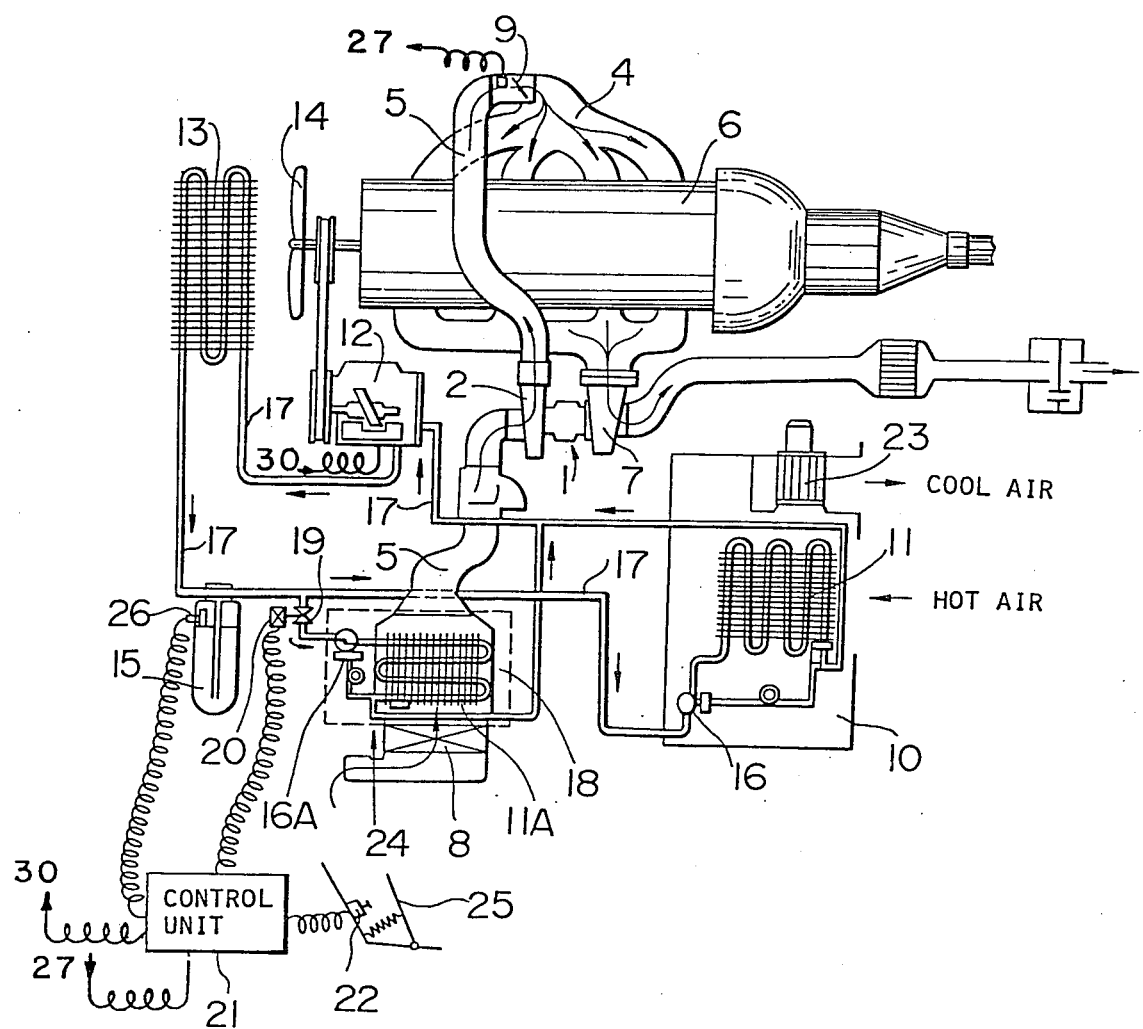

SUPPLY-AIR COOLING SYSTEM FOR AN ENGINE INCLUDING A TURBOCHARGER

BACKGROUND OF THE INVENTION

1. Field of the Invention

The present invention relates generally to a system for cooling the air which is supplied to an engine by a turbocharger driven by the exhaust gas, and more specifically to a supply-air cooling system whereby when engine load rises beyond a predetermined level, the supply air is cooled before being pressurized by an air-supply blower.

2. Description of the Prior Art

In order to improve the fuel consumption rate of an automotive vehicle engine, a turbocharger has recently attracted attention in the industry, in which the power of the exhaust gas rotates an air-supply blower connected to a turbine for forcibly supplying air into the engine, in order to improve the efficiency in supplying intake air, that is, to improve the engine output.

Heretofore, in such an engine provided with a turbocharger as described above, temperature of the supply air pressurized by the air-supply blower rises as high as 150° C. under heavy load in a steady state. Therefore, the density of the supply air is inevitably reduced due to an increase in temperature of the supply air, and, as a result, the efficiency in supplying intake air cannot rise to as high an extent as expected. In other words, there exists a problem such that it is impossible to improve the engine output as much as theoretically possible. Further, in the case of a gasoline engine, the higher the supply-air temperature, the more often engine knocking occurs.

To overcome this problem, there exists a simple prior-art cooling system by which pressurized supply air is cooled to increase the density of intake air before being introduced into the engine. This prior-art cooling system comprises only a cooling-fin unit, such as a radiator, to exchange heat.

In such a simple prior-art supply-air cooling device, however, since heat is absorbed by only the atmosphere and the difference in temperature between the heated supply air and the atmosphere is relatively small, it has been necessary to increase the area from which heat is emitted in order to obtain a sufficient heat exchange rate. In addition, there has been a need to increase the cross-sectional area of the duct through which the air is supplied, in order to reduce pressure loss due to flow resistance within the ducts. As a result, the size and volume of the cooling device itself inevitably becomes large, thereby increases in pressure of the air supplied to the engine are delayed.

Further, since the cooling device is disposed for downstream from the air-supply blower, significant pressure-resistance and leakage-resistance are required.

A more detailed description of the prior-art supply-air cooling system will be made hereinafter under DETAILED DESCRIPTION OF THE PREFERRED EMBODIMENTS with reference to the attached drawing.

SUMMARY OF THE INVENTION

With these problems in mind therefore, it is the primary object of the present invention to provide a supply-air cooling system for an engine including a turbocharger such that supply air is cooled by a cooler system used for cooling the passenger compartment before the air is pressurized by the air-supply blower, when the engine load is relatively heavy.

To achieve the above-mentioned object, the supply-air cooling system for an engine including a turbocharger according to the present invention comprises a cooling-fin unit for cooling the supply-air before being pressurized by the air-supply blower, an electromagnetic valve for circulating the refrigerant into the cooling-fin unit, and a control unit for opening the electromagnetic valve only when the engine load rises beyond a predetermined level, in addition to a cooler system for cooling the passenger compartment.

BRIEF DESCRIPTION OF THE DRAWINGS

The features and advantages of the supply-air cooling system for an engine including a turbocharger according to the present invention will be more clearly appreciated from the following description taken in conjunction with the accompanying drawings in which like reference numerals designate corresponding elements and in which:

FIG. 2 is a diagrammatical view of a preferred embodiment of the supply-air cooling system for an engine including a turbocharger according to the present invention.

DETAILED DESCRIPTION OF THE PREFERRED EMBODIMENTS

Figure 1:
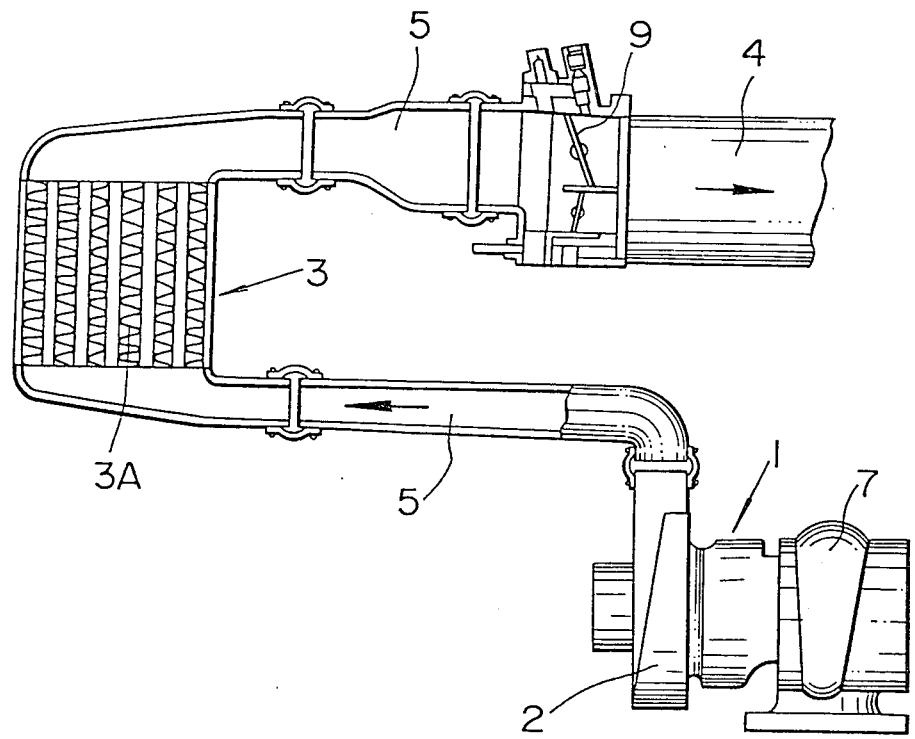
FIG. 1 is a diagrammatical, partially sectional view of a prior-art supply-air cooling system for an engine including a turbocharger.

To facilitate understanding of the present invention, a brief reference will be made to a prior-art supply-air cooling unit for an engine including a turbocharger, with reference to the attached drawing.

In FIG. 1, the supply air pressurized by an air-supply blower 2 of a turbocharger 1 is once fed into an supply-air cooling unit 3 including fins 3A, such as a radiator, to exchange heat with the engine coolant. After having been cooled through this cooling unit, the air is next supplied into an engine through an intake manifold 4. In this figure, the reference numeral 9 denotes a throttle valve.

In a prior-art supply-air cooling unit 3 in which the heat is exchanged with the atmosphere since the difference in temperature between the supply air and the atmosphere is relatively small, in order to achieve a sufficient heat exchange rate there has been a need to increase the area from which heat is radiated. Additionally, there has been a need to increase the cross-sectional area of the duct through which the air is supplied in order to reduce pressure loss due to flow resistance within the ducts. As a result, the volume of the supply-air cooling unit itself 3 is inevitably increased. In addition to the above problem, changes in pressure of supplied air are delayed, so that the response of the pressurization of supply air is noticeably sluggish when the vehicle is accelerated or decelerated.

Furthermore, since the supply-air cooling unit 3 is disposed in the intake air duct 5 far downstream from the air-supply blower 2 in order to cool the pressurized supply-air, significant pressure-resistance and leakage-resistance are required of the system. In addition, since the supply-air cooling unit 3 must have easy access to open air, in most internal combustion engines, a very long intake duct 5 is also required.

In view of the above description, reference is now made to FIG. 2, in which a preferred embodiment of the supply-air cooling system for an engine including a turbocharger according to the present invention is diagrammatically illustrated.

In FIG. 2, the reference numeral 6 denotes an engine, the numeral 1 denotes a turbocharger, which comprises a turbine 7 driven by the engine exhaust gas introduced from the engine through an exhaust manifold, and the numeral 2 denotes an air-supply blower for forcibly supplying the air introduced from an air cleaner 8 into the engine 6 through an intake manifold 4. In this embodiment, however, a throttle valve 9 is disposed in an intake duct 5 downstream from the air-supply blower 2.

The reference numeral 10 denotes a cooling fin unit for cooling the passenger compartment, by which cool air for the passenger compartment is produced. The evaporated refrigerant (for example, Freon) within an evaporator 11 is introduced into a cooler compressor 12 driven by the engine 6 through a belt so as to be compressed and liquefied. After having passed through a condenser 13 and cooled by a cooling fan 14, the liquefied Freon is first stored within a liquid tank 15 and is next circulated into the cooling fin unit 10. In this case, the liquefied refrigerant evaporates as it passes through a throttle valve 16.

A cooling fan 23 introduces hot air from the passenger compartment for passage through the cooling fin unit 10 and blows cooled air from the cooling fin unit into the passenger compartment.

In such a cooler system for the passenger compartment as described above, some refrigerant used for cooling the passenger compartment is additionally diverted from a position downstream from the liquid tank 15 disposed midway in the circulation duct 17 in order to cool the supply air before being pressurized by the air-supply blower 2. That is to say, a cooling fin unit 18 for cooling the supply air is provided, in parallel with the cooling fin unit 10, at a position upstream from the air-supply blower 2, for example, at such a position as in the intake duct 5 near the air cleaner 8.

The cooling fin unit 18 for cooling the supply air is constructed in almost the same manner as in the cooling fin unit 10 for cooling the passenger compartment. That is, the cooling fin unit 18 is provided with a zigzag-shaped evaporator 11A and a throttle valve 16A so as to efficiently cool the supply air introduced from the air cleaner 8.

Further, the supply-air cooling fin unit 18 is provided with an electromagnetic valve 20 at its inlet port 19 in order that the refrigerant within the above-mentioned liquid tank 15 is selectively introduced thereinto according to the degree of engine load, and further with a control unit 21 to control the electromagnetic valve 20.

The control unit 21 controls the electromagnetic valve 20 so that the valve 20 opens when the angle of the throttle valve 9 exceeds a predetermined value in response to a signal sent from a means for detecting the degree of engine load, for instance, a throttle switch 22 positioned near an accelerator pedal 25 for detecting the angle of the throttle valve 9 or a pressure sensor responsive to vacuum changes resulting from throttle valve operation connected to the control unit by lines 27—27. The control unit further controls the cooler system so that the circulation of the refrigerant can be increased by actuating the cooler compressor 12 after detecting the state where the amount or the pressure of the refrigerant within the liquid tank 15 drops below a predetermined value, when the electromagnetic valve 20 is open, by an appropriate liquid level sensor 26 or an appropriate pressure sensor (not shown).

In this case, when the cooler compressor 12 is actuated, the cooling fin unit 10 for cooling the passenger compartment is also supplied with the refrigerant to cool the passenger compartment; however, it is possible to prevent the passenger compartment from being unnecessarily cooled in such a way that the system stops the cooling fan 23 from rotating or the system is constructed so that the refrigerant is supplied only to the cooling fin unit 18 for cooling the supply air by additionally providing a switching valve (not shown).

Therefore, in the cooling system as described above, when the engine load increases to the point where the angle of the throttle valve 9 exceeds a predetermined value, that is, when the pressure and the temperature of forcibly-supplied air begin to increase, the throttle switch 22 is turned on; the control unit 21 opens the electromagnetic valve 20; thus the refrigerant is supplied to the cooling fin unit 18 for cooling the supply air and the supply air introduced from the air cleaner 8 to the air supply blower 2 is sufficiently cooled.

Although the temperature of the supply air cooled before being introduced into the air supply blower 2 will rise after being pressurized, if the compression ratio is constant, the cooling effect will be greater than in the case where the supply air is cooled after having been pressurized.

Furthermore, the lower the temperature of supply air before being pressurized, the higher the density of supply air after being pressurized. Therefore, it is possible to markedly improve the efficiency of supplying intake air to the engine and thus the output of the engine, while avoiding engine knocking (in the case of a gasoline engine) by efficiently reducing the supply-air temperature.

Furthermore, since the supply air is dehumidified at the same time as being cooled, the partial pressure of water vapour within the supply air introduced into the engine after being pressurized by the air supply blower 2 is lowered, thus further increasing the efficiency of the supply of intake air.

As described hereinabove, since the supply air before being pressurized by the air supply blower 2 is selectively cooled by the cooling fin unit according to the degree of engine load, it is possible to markedly improve the cooling effect. Accordingly, it is possible to improve engine performance, in particular, when the load is heavy, thus improving engine output.

Furthermore, being different from the above-mentioned prior-art system it is possible to speed response of the pressurization of supply air even when the engine is accelerated, because the supply-air cooling system itself need not be large in size and therefore the pressure changes in supply air are not delayed.

Furthermore, since no special attention is required for the pressure-resistance or leakage-resistance in the supply-air cooling system, and since no large and long intake duct is required, it is possible to reduce flow resistance within the duct.

Furthermore, since the supply air cooled by the refrigerant is introduced into the cooling fin unit for cooling supply air even when the pressure of the supply air is not high at relatively low engine speeds, it is possible to increase the density of supply air and to improve engine output.

Furthermore, it may be preferable to provide a second cooler used for cooling supply air independently from the cooler for cooling the passenger compartment.

As described above, in the supply-air cooling system for an engine including a turbocharger according to the present invention, since the system is so constructed that supply air is cooled before being pressurized by the air-supply blower, there exists an effect such that engine output is markedly improved by sufficiently cooling supply air and by markedly increasing the efficiency of the oversupply of intake air, while improving the engine response when the engine is accelerated or decelerated depending upon a decrease in flow resistance within the supply air duct.

It will be understood by those skilled in the art that the foregoing description is in terms of preferred embodiments of the present invention wherein various changes and modifications may be made without departing from the spirit and scope of the invention, as is set forth in the appended claims.

What is claimed is:

1. A supply-air cooling system for an engine having a turbocharger for operating an air-supply blower connected to a turbine driven by exhaust gas for forcibly supplying air to the engine through an intake duct, which comprises:
    (a) a first cooling fin means for cooling the supply air introduced into the engine, said cooling fin means being disposed upstream from the air-supply blower;
    (b) a second cooling fin means for cooling a passenger compartment, said second cooling fin means being connected in parallel with said first cooling fin means;
    (c) a compressor for compressing the refrigerant evaporated within said first and second cooling fin means after having absorbed heat therethrough.
    (d) a condenser for liquefying the refrigerant compressed by said compressor;
    (e) a liquid tank for temporarily storing the refrigerant liquefied in said condenser;
    (f) first and second throttles connected between said liquid tank and said first cooling fin means and between said liquid tank and said second cooling fin means, respectively, for gasifying the refrigerant stored in said liquid tank;
    (g) an electromagnetic valve for opening and closing a duct disposed between said liquid tank and said first throttle;
    (h) a throttle switch actuated when an accelerator pedal is depressed beyond a predetermined point, thereby detecting a degree of engine load; and
    (i) a control unit for outputting a signal to said electromagnetic valve to open said valve when said throttle switch detects that engine load is heavy,
    whereby the supply-air cooling system is used in common with the passenger compartment cooling system when engine load rises beyond a predetermined value.

2. A supply-air cooling system for an engine including a turbocharger as set forth in claim 1, which further comprises a liquid level sensor disposed within said liquid tank for applying a signal to said control unit so that said compressor can be operated for further producing liquefied refrigerant.

3. A supply-air cooling system for an engine including a turbocharger as set forth in claim 1 further comprising a cooling fan means for introducing hot air from the passenger compartment onto said second cooling fin means and for blowing cool air into said passenger compartment.

* * * * *